(12) United States Patent
Carter et al.

(10) Patent No.: US 7,286,977 B1
(45) Date of Patent: *Oct. 23, 2007

(54) INTENTIONAL-STANCE CHARACTERIZATION OF A GENERAL CONTENT STREAM OR REPOSITORY

(75) Inventors: Stephen R. Carter, Spanish Fork, UT (US); Delos C. Jensen, Orem, UT (US)

(73) Assignee: Novell, Inc., Provo, UT (US)

( * ) Notice: Subject to any disclaimer, the term of this patent is extended or adjusted under 35 U.S.C. 154(b) by 1052 days.

This patent is subject to a terminal disclaimer.

(21) Appl. No.: 09/653,713

(22) Filed: Sep. 5, 2000

(51) Int. Cl.
*G06F 17/27* (2006.01)
(52) U.S. Cl. .................. 704/9; 704/1; 704/10; 707/100
(58) Field of Classification Search ............. 707/1, 707/2–5; 704/9, 10
See application file for complete search history.

(56) References Cited

U.S. PATENT DOCUMENTS

| | | | |
|---|---|---|---|
| 5,276,677 A | 1/1994 | Ramamurthy et al. ......... 370/60 |
| 5,278,980 A | 1/1994 | Pedersen et al. | |
| 5,317,507 A | 5/1994 | Gallant .................. 364/419.13 |
| 5,325,298 A | 6/1994 | Gallant .................. 364/419.19 |
| 5,390,281 A * | 2/1995 | Luciw et al. ................. 706/11 |
| 5,539,841 A * | 7/1996 | Huttenlocher et al. ...... 382/218 |
| 5,551,049 A * | 8/1996 | Kaplan et al. .............. 707/532 |
| 5,619,709 A * | 4/1997 | Caid et al. .................. 715/532 |
| 5,675,819 A * | 10/1997 | Schuetze ..................... 704/10 |
| 5,694,523 A | 12/1997 | Wical ........................... 395/12 |
| 5,696,962 A | 12/1997 | Kupiec ....................... 395/604 |
| 5,708,825 A | 1/1998 | Sotomayor .................. 395/762 |
| 5,721,897 A * | 2/1998 | Rubinstein ..................... 707/2 |
| 5,778,362 A | 7/1998 | Deerwester .................... 707/5 |
| 5,778,378 A * | 7/1998 | Rubin ......................... 707/103 |
| 5,778,397 A | 7/1998 | Kupiec et al. .............. 707/500 |
| 5,794,178 A | 8/1998 | Caid et al. ..................... 704/9 |
| 5,799,276 A | 8/1998 | Komissarchik et al. ..... 704/251 |
| 5,822,731 A * | 10/1998 | Schultz ....................... 704/256 |
| 5,832,470 A | 11/1998 | Morita et al. | |
| 5,867,799 A * | 2/1999 | Lang et al. ..................... 707/1 |
| 5,873,056 A | 2/1999 | Liddy et al. ................... 704/9 |
| 5,934,910 A | 8/1999 | Ho et al. ..................... 434/362 |

(Continued)

OTHER PUBLICATIONS

Brian T. Bartell, Garrison W. Cottrell and Richard K. Belew, "Latent Semantic Indexing is an Optimal Special Case of Multidimensional Scaling," Department of Computer Science & Engineering-0114, University of California, 7 pages.

(Continued)

*Primary Examiner*—Patrick N. Edouard
*Assistant Examiner*—Lamont Spooner
(74) *Attorney, Agent, or Firm*—Marger, Johnson and McCollom, P.C.

(57) ABSTRACT

Starting with a dictionary including concepts and chains, a subset of the chains is selected as intentional stance basis chains (ISBCs). Concepts in the dictionary are chosen and mapped to state vectors using the ISBCs. The state vectors are assembled into a template, and an action and threshold distance are assigned to the template. When an impact summary is generated for a content source, the distance between the impact summary and the template is measured. If the distance is less than the threshold distance associated with the action for the template, the action is performed.

12 Claims, 13 Drawing Sheets

U.S. PATENT DOCUMENTS

| | | | |
|---|---|---|---|
| 5,937,400 A | 8/1999 | Au | |
| 5,940,821 A | 8/1999 | Wical | 707/3 |
| 5,963,965 A | 10/1999 | Vogel | 707/501.1 |
| 5,966,686 A * | 10/1999 | Heidorn et al. | 704/9 |
| 5,970,490 A | 10/1999 | Morgenstern | 707/10 |
| 5,974,412 A * | 10/1999 | Hazlehurst et al. | 707/3 |
| 5,991,713 A * | 11/1999 | Unger et al. | 704/9 |
| 6,006,221 A | 12/1999 | Liddy | |
| 6,009,418 A | 12/1999 | Cooper | 706/15 |
| 6,078,953 A | 6/2000 | Vaid et al. | 709/223 |
| 6,085,201 A * | 7/2000 | Tso | 715/505 |
| 6,097,697 A | 8/2000 | Yao et al. | |
| 6,105,044 A | 8/2000 | De Rose et al. | |
| 6,108,619 A | 8/2000 | Carter et al. | 704/9 |
| 6,122,628 A * | 9/2000 | Castelli et al. | 707/5 |
| 6,173,261 B1 | 1/2001 | Arai et al. | 704/257 |
| 6,205,456 B1 | 3/2001 | Nakao | 707/531 |
| 6,289,353 B1 * | 9/2001 | Hazlehurst et al. | 707/102 |
| 6,295,533 B2 | 9/2001 | Cohen | |
| 6,297,824 B1 | 10/2001 | Hearst et al. | |
| 6,311,194 B1 | 10/2001 | Sheth et al. | 707/505 |
| 6,317,708 B1 | 11/2001 | Witbrock et al. | 704/9 |
| 6,317,709 B1 | 11/2001 | Witbrock et al. | 704/225 |
| 6,356,864 B1 | 3/2002 | Foltz et al. | 704/1 |
| 6,363,378 B1 * | 3/2002 | Conklin et al. | 707/5 |
| 6,459,809 B1 | 10/2002 | Jensen et al. | 382/203 |
| 6,470,307 B1 | 10/2002 | Turney | 704/9 |
| 6,493,663 B1 * | 12/2002 | Ueda | 704/9 |
| 6,513,031 B1 | 1/2003 | Fries et al. | 707/3 |
| 6,523,026 B1 | 2/2003 | Gillis | 707/3 |
| 6,615,208 B1 | 9/2003 | Behrens et al. | 707/5 |
| 6,675,159 B1 | 1/2004 | Lin et al. | 707/3 |

OTHER PUBLICATIONS

*Applications of Functional Analysis and Operator Theory*, V. Hutson, J. S. Pym, 1980, table of contents, preface and index.

Latent Semantic Indexing is an Optimal Special Case of Multidimensional Scaling, Brian T. Bartell, Garrison W. Cottrell, Richard K. Belew, pp. 161-167, 1992; ACM 0-89791-524-0.

Improving Relevance Feedback in the Vector Space Model, Carol Lundquist, David A. Grossman, Ophir Frieder, 1997, pp. 61-23; ACM 0-89791-970-X.

A Multilevel Approach to Intelligent Information Filtering: Model, System, and Evaluation, J. Mostafa, S. Mukhopadhyay, W. Lam, M. Palakal, ACM Transactions on Information Systems, vol. 15, No. 4, Oct. 1997, pp. 368-399.

Capturing the State of Distributed Systems with XML, Rohit Khare and Adam Rifkin, Oct. 26, 1997, pp. 1-12.

Semantic Information Retrieval, Annelise Mark Pejtersen, pp. 90-92, Communications of the ACM, Apr. 1998/vol. 41. No. 4.

Unifying Heterogeneous Information Models, Narinder Singh, pp. 37-44, Communications of the ACM, May 1998/vol. 41, No. 5.

Platform for Internet Content Selection (PICS), Jan. 3, 1998, http://www.w3.org/pics/.

Intelligent Collaboration & Visualization, pp. 1-16.

Noam Chomsky, "Language and Thought," 1993, pp. 18-19, 22-27, 44-45, 60-61.

Jonathan Culler, "Ferdinand de Saussure—Revised Edition," 1986, pp. 38-57.

Umberto Eco, Marco Santambrogio and Patrizia Violi (Editors), "Meaning and Mental Representations," 1988, p. 221.

Donald W. Kahn, "Topology—An Introduction to the Point-Set and Algebraic Areas," 1975, pp. 10-15.

Paul R. Halmos, "Naïve Set Theory," 1960, pp. 56-57, 66-69.

John G. Hocking and Gail S. Young, "Topology," 1961, pp. 6-7, 56-59, 68-71.

Umberto Eco, "Semiotics and the Philosophy of Language," 1984, pp. 46-87.

Noam Chomsky, "The Minimalist Program," 1995, pp. 13-65.

R. E. Edwards, "Functional Analysis—Theory and Applications," 1965, pp. 10-13, 32-33, 50-53, 62-65, 88-103, 174-203, 224-233.

Cognitive Science Laboratory at Princeton University, "WordNet—A Lexical Database for English," printed Feb. 10, 2000, selected pages from website.

Bartell, et al., "Latent Semantic Indexing is an Optimal Special Case of Multidimensional Scaling," *Dept. of Computer Science & Engineering*, University of California, San Diego, 1992, 7 pages.

Chomsky, *"Language and Thought,"* 1993, pp. 18-19, 22-27, 44-45, 60-61.

Chomsky, *"The Minimalist Program,"* 1995, pp. 13-65.

Cook et al., *"Chomsky's Universal Grammar—An Introduction,"* 1988, pp. 40-74, 131-272.

Culler, *"Ferdinand de Saussure—Revised Edition,"* 1986, pp. 38-57.

Eco et al., *"Meaning and Mental Representations,"* 1988, p. 221.

Eco, *"Semiotics and the Philisophy of Language,"* 1984, p. 46-86.

Edwards, *"Functional Analysis: theory and applications,"* 1965, pp. 10-13, 32-33, 50-53, 62-65, 88-103, 174-203, 224-233.

Halmos, *"Naïve Set Theory,"* Undergraduate Texts in Mathematics, 1968, pp. 56-57, 66-69.

Hocking, *"Topology,",* 1961, pp. 6-7, 56-9, 68-71.

Hutson, *"Applications of Functional Analysis and Operator Theory,"* 1980, index, preface, and Table of Contents.

Kahn, *"Topology: An Introduction to the Point-Set and Algebraic Areas,"* 1975, pp. 10-15.

Khare et al., *"Capturing the State of Distributed Systems with XML,"* Oct. 26, 1997, pp. 1-12.

Lundquist et al., *"Improving Relevance Feedback in the Vector Space Model,"* 1997, pp. 16-23.

Mostafa et al., "A Multilevel Approach to Intelligent Information Filtering: Model, Systems, and Evaluation," *ACM Transactions on Information Systems*, vol. 15, No. 4, Oct. 1997, pp. 368-399.

Pesetsky, *"Zero Syntax: experiencers and cascades,"* 1995, pp. 1-122.

Pejtersen,"Semantic Information Retrieval," *Communications of the ACM*, vol. 41, No. 5, Apr. 1998, pp. 90-92.

"Platform for Internet Content Selection (*PICS*)," http://www.w3.org, pp. 1-8.

Singh, "Unifying Heterogeneous Information Models," *Tesserae Information Systems, Inc.,* http://citeseer.ist.psu.edu.com, pp. 1-13.

Smith, *"Computers and human language,"* 1991, pp. 205-257.

"WordNet—a lexical database for the English language," *Cognitive Science Laboratory*, Princeton University, www.cogsci.princeton.edu, 2 pgs.

George W. Smith, "Computers and Human Language," 1991, pp. 204-257.

Vivian Cook and Mark Newson, "Chomsky's Universal Grammar—An Introduction," 1988, pp. 40-74, 131-272.

David Pesetsky, "Zero Syntax Experiencers and Cascades," 1995, pp. 1-122.

Noam Chomsky, "The Minimalist Program," 1995, pp. 13-127.

Semantic Information Retrieval, Annelise Mark Pejtersen, pp. 90-92, Communications of the ACM, Apr. 1998/vol. 41, No. 5.

Onyshkevych and Nirenburg; *"A Lexicon for Knowledge-Based MT"*; Undated (pp. 1-49).

Mahesh; *"Ontology Development for Machine Translation: Ideology and Method"*; Computing Research Laboratory, New Mexico State University; Undated (87 pages).

* cited by examiner

US 7,286,977 B1

INTENTIONAL-STANCE CHARACTERIZATION OF A GENERAL CONTENT STREAM OR REPOSITORY

RELATED APPLICATION DATA

This application is related to U.S. Pat. No. 6,108,619, issued Aug. 22, 2000, titled "METHOD AND APPARATUS FOR SEMANTIC CHARACTERIZATION," co-pending U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, and to co-pending U.S. patent application Ser. No. 09/615,726, titled "A METHOD AND MECHANISM FOR THE CREATION, MAINTENANCE, AND COMPARISON OF SEMANTIC ABSTRACTS," filed Jul. 13, 2000, all commonly assigned.

FIELD OF THE INVENTION

This invention pertains to determining in a computer the semantic content of documents, and more particularly to determining and responding to the emotional content of the documents.

BACKGROUND OF THE INVENTION

U.S. patent application Ser. No. 09/109,804, titled "METHOD AND APPARATUS FOR SEMANTIC CHARACTERIZATION," filed Jul. 2, 1998, U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, and U.S. patent application Ser. No., 09/615,726, titled "A METHOD AND MECHANISM FOR THE CREATION, MAINTENANCE, AND COMPARISON OF SEMANTIC ABSTRACTS," filed Jul. 13, 2000, provide a framework and mechanism in a computer for providing a "quantized" meaning-representation. But the semantic meaning of documents is not the only factor controlling interpretation of the documents. People have emotional responses to the world around them. What one person might view with emotional detachment can cause another person to respond strongly. Even more, people can have different emotional responses to the same content, depending on their point of view. For example, given an article proposing abortion regulation, many people would vehemently oppose the regulation, while others would avidly support it. Currently, however, no mechanism exists to enable users to automate the process of identifying and responding to documents or other content to which the users have an emotional response.

The present invention addresses these and other problems associated with the prior art.

SUMMARY OF THE INVENTION

The invention is a computer-implemented method and apparatus for building a template specifying an emotional response to a content stream. A dictionary is selected. The dictionary includes concepts organized as a directed set and chains overlaid on top of the concepts. A subset of the chains are selected as intentional stance basis chains (ISBCs). State vectors are constructed in a topological vector space for a subset of the concepts in the dictionary. The state vectors are assembled into a template, and an action and threshold distance are assigned to, or associated with, the template. As content becomes available, impact summaries of the content are compared with the template. If the impact summary is within the threshold distance of the template, the action is performed.

The invention enables a computer to determine whether a content stream provokes an emotional response. A template is constructed in a topological vector space as described above. An impact summary is constructed or generated for the content stream, and is compared with the template. The comparison can be made by measuring a distance between the impact summary and the template in the topological vector space.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Introduction to Templates

U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, incorporated by reference herein and referred to as "the Construction application," describes the creation of state vectors in a topological vector space for concepts in a dictionary. U.S. patent application Ser. No., 09/615,726, titled "A METHOD AND MECHANISM FOR THE CREATION, MAINTENANCE, AND COMPARISON OF SEMANTIC ABSTRACTS," filed, Jul. 13, 2000, incorporated by reference herein and referred to as "the Semantic Abstracts application," takes state vectors for individual lexemes/lexeme phrases and assembles them into semantic abstracts for documents.

The techniques used in the Semantic Abstracts application can be applied to building intentional stance impact templates (or "templates" for short). Instead of working with an abstract of a document, however, the template begins with an abstract of content to which the user would have an emotional response. For example, an anti-abortion activist might select the phrase "The doctor aborted the fetus" as an abstract of content to which he has an emotional response. The abstract is then parsed into its constituent lexemes/lexeme phrases, and each lexeme/lexeme phrase is mapped to a state vector in a topological vector space. The state vectors are collected to form the template, and an action is assigned to the template. For example, the anti-abortion activist might assign as an action to the template to send a letter to each of his representatives in Congress. (Although example uses of the invention will be presented using textual documents, a person skilled in the art will recognize that the invention is equally applicable to non-textual works. For example, images or music can provoke emotional responses in people just as strongly as written words.)

Alternatively, the hypothetical anti-abortion activist could be reading an electronic version of a report. Upon encountering a paragraph that the activist finds incendiary, the activist can mark the paragraph. The paragraph can be semantically analyzed and disassembled into its component lexemes/lexeme phrases. Vectors can be created from the lexemes/lexeme phrases. If necessary, the vectors can be filtered. Then the filtered vectors can be assembled into a template, and an action assigned to the template. In this manner, the template can be created without the activist having to summarize the material.

A reader familiar with the Semantic Abstracts application will observe that templates have similarities with semantic abstracts. Both represent distilled content. Both include sets of state vectors in topological vector spaces. But whereas semantic abstracts are associated with particular documents, templates are not linked to any particular document.

Systems for Building and Using Templates

Figure 1:
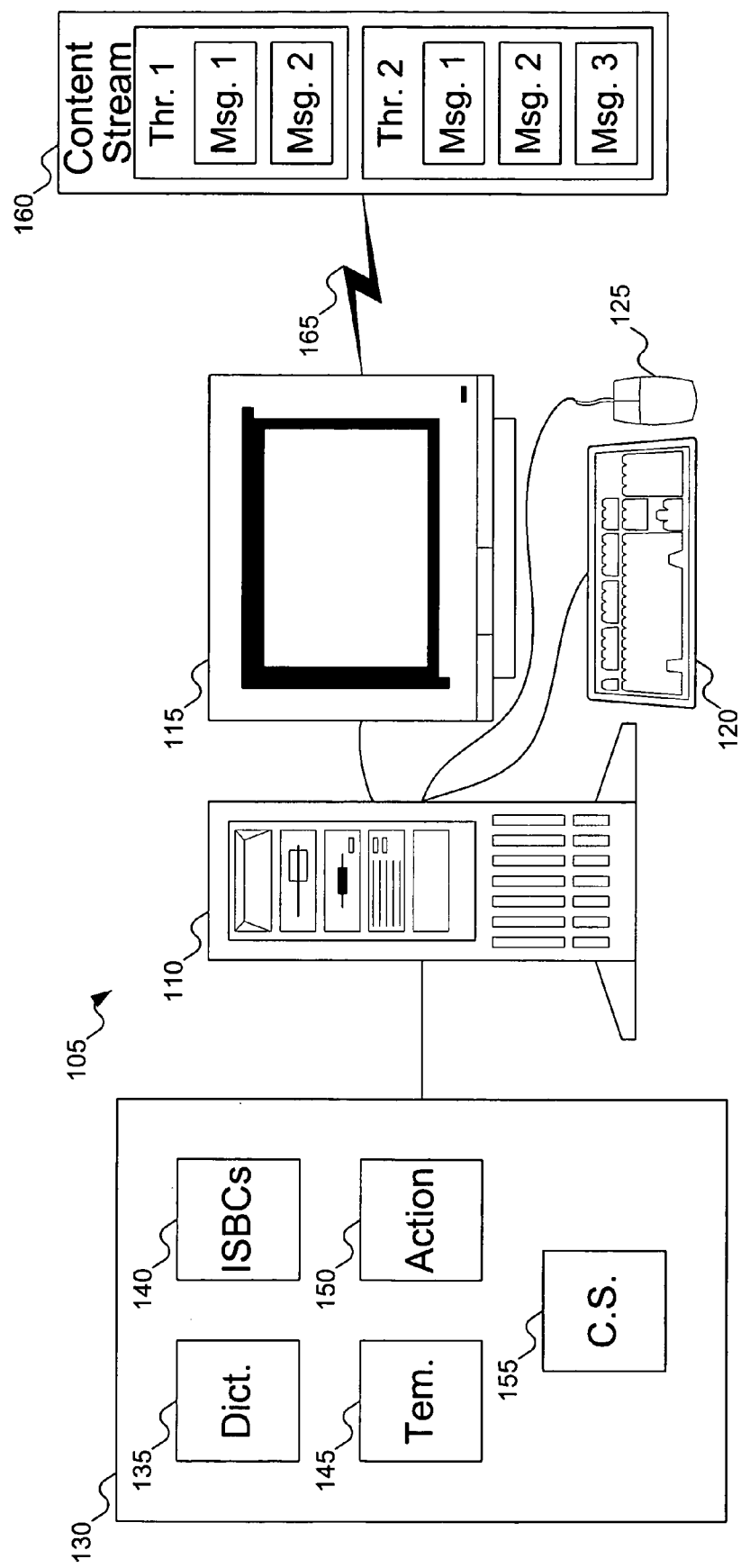
FIG. 1 shows a computer system on which the invention can operate to create templates and impact summaries for content streams.

Now that the reader is familiar with the high-level design goals of templates, the techniques of constructing and using templates can be explained in greater detail. FIG. 1 shows a computer system 105 on which a method and apparatus for using a multi-dimensional semantic space can operate. Computer system 105 conventionally includes a computer 110, a monitor 115, a keyboard 120, and a mouse 125. Computer system 105 can also be an Internet appliance, lacking monitor 115, keyboard 120, or mouse 125. Optional equipment not shown in FIG. 1 can include a printer and other input/output devices. Also not shown in FIG. 1 are the conventional internal components of computer system 105: e.g., a central processing unit, memory, file system, etc.

Figure 2:
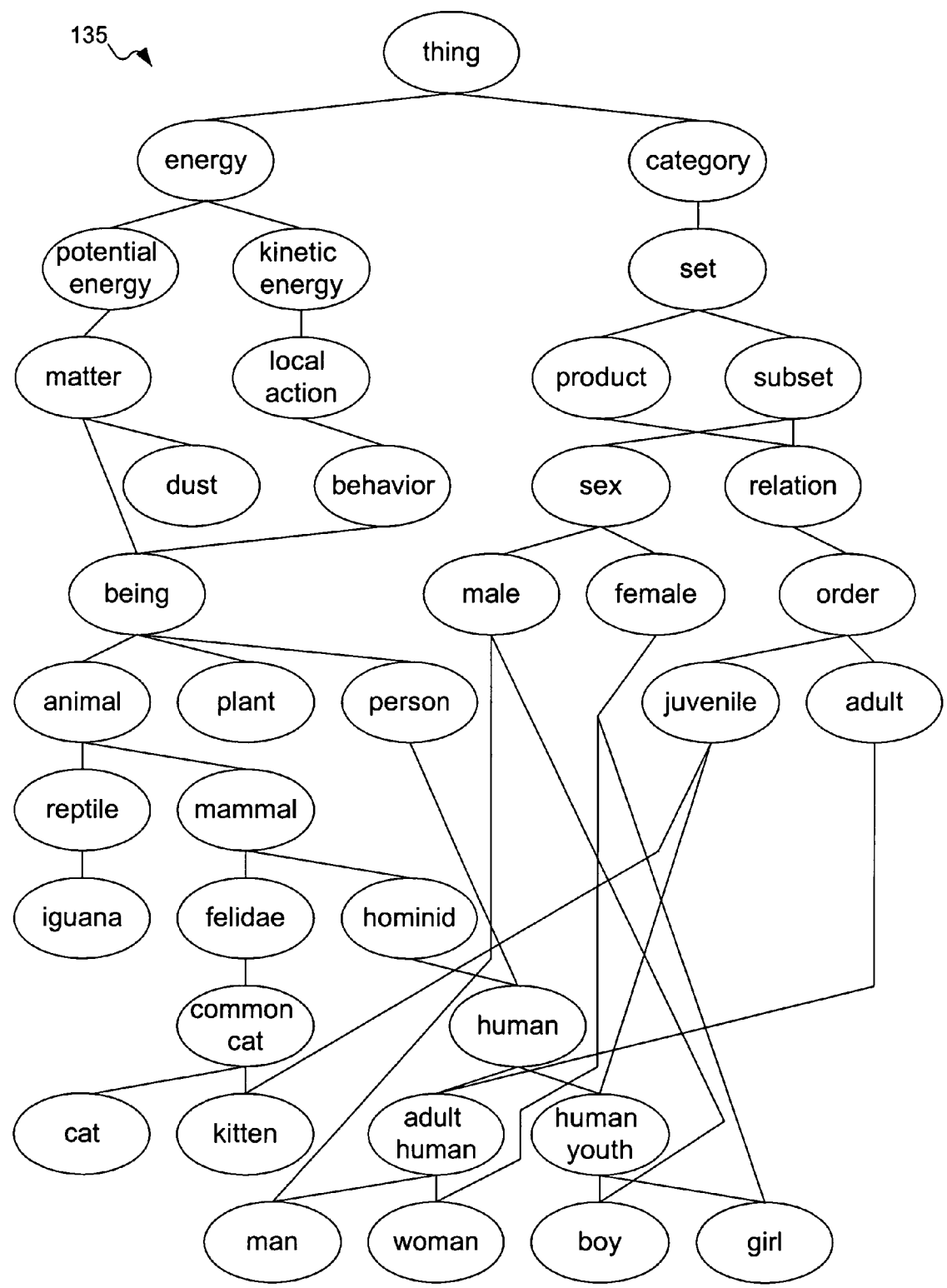
FIG. 2 shows a dictionary including concepts over which chains have been laid, from which intentional stance basis chains can be selected.

Computer system 105 further includes software 230. In FIG. 1, software 130 includes dictionary 135, intentional stance basis chains (ISBCs) 140, template 145, action 150, and comparison software 155. Dictionary 135 provides the foundation for the topological vector space used to construct the template. FIG. 2 shows a sample dictionary 135 including concepts and chains. (Dictionary 135 shown in FIG. 2 is drawn from the Construction application.) Dictionary 135 includes a set of concepts, typically organized as a directed set. At the top of the directed set is a particular concept known as the maximal element. For each concept in the directed set other tan the maximal element, there is at least one "parent" concept in the directed set that is a generalization of that concept. (There can be multiple "parent" concepts, because language allows for overloading of wards.) The "parent-child" relationships between concepts are represented symbolically in FIG. 2 using directed links. Viewed another way, the "parent" concept can be considered a source of a directed link, and the "child" concept can be considered a sink of the directed link. The relationships between concepts can be extended all the way to the maximal element; the hierarchy of such relationships between the maximal element and each concept are called chains.

Figure 3A:
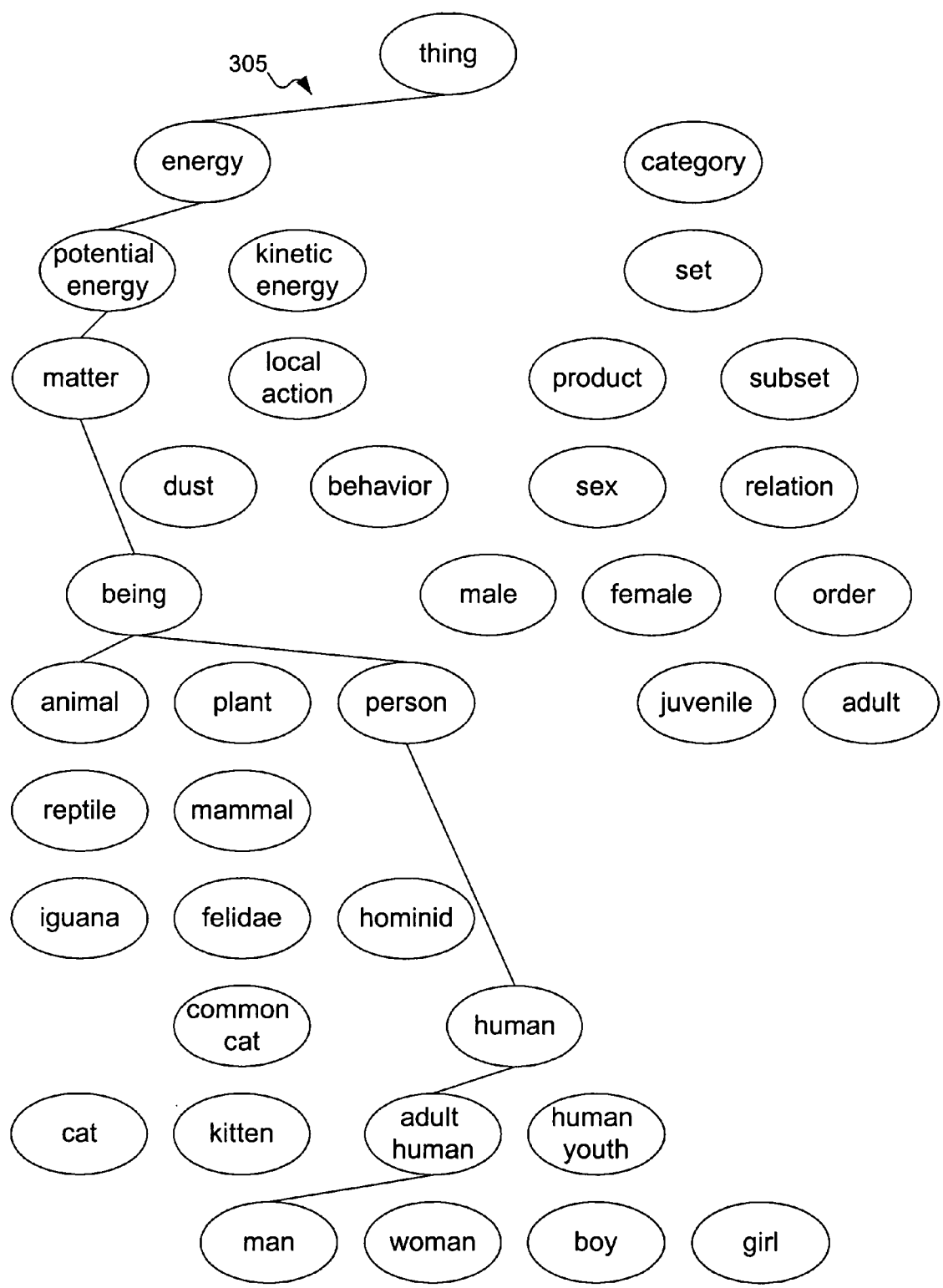
FIGS. 3A-3G show eight different intentional stance basis chains in the dictionary of FIG. 2.
Figure 3B:
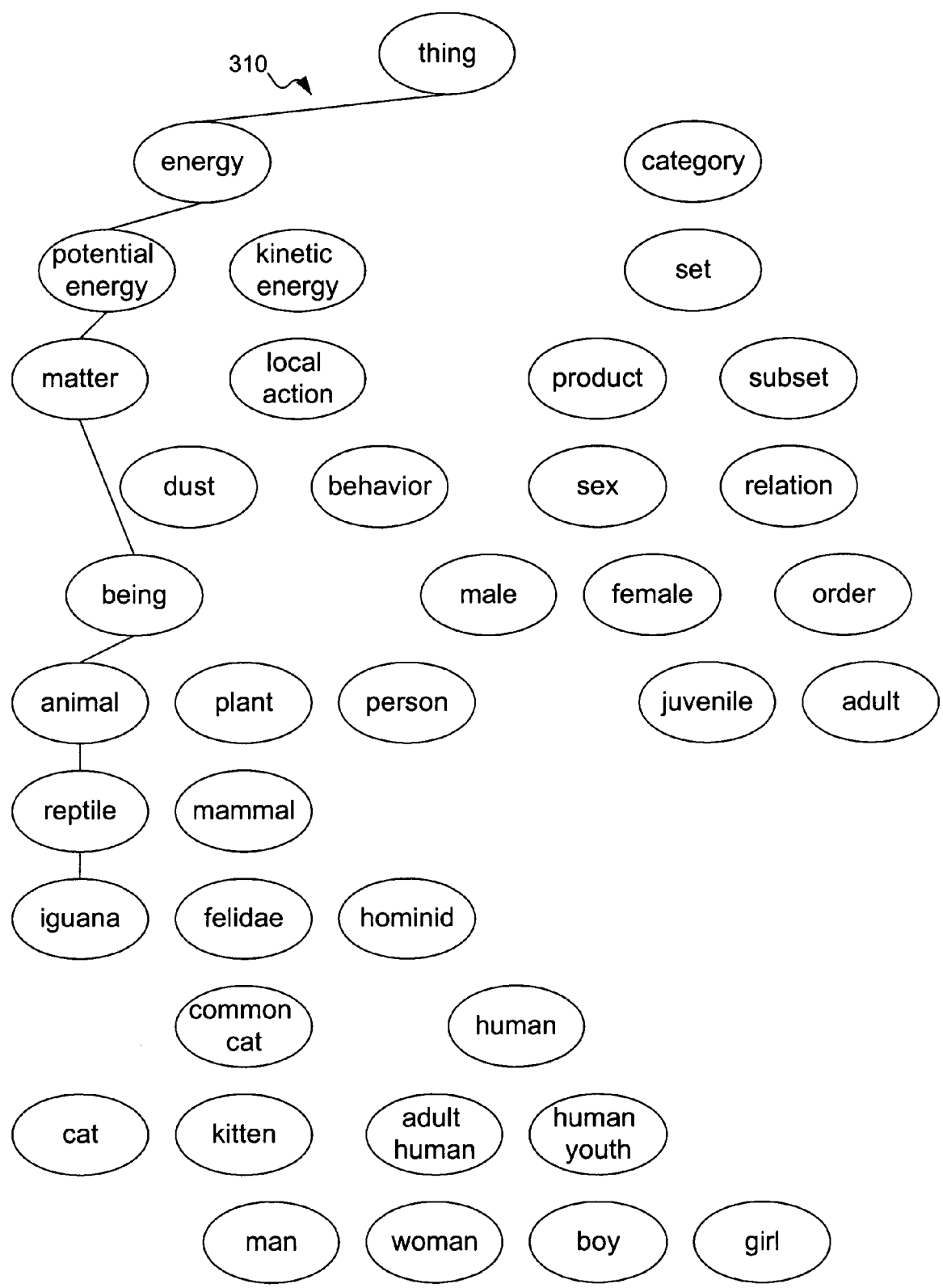
Figure 3C:
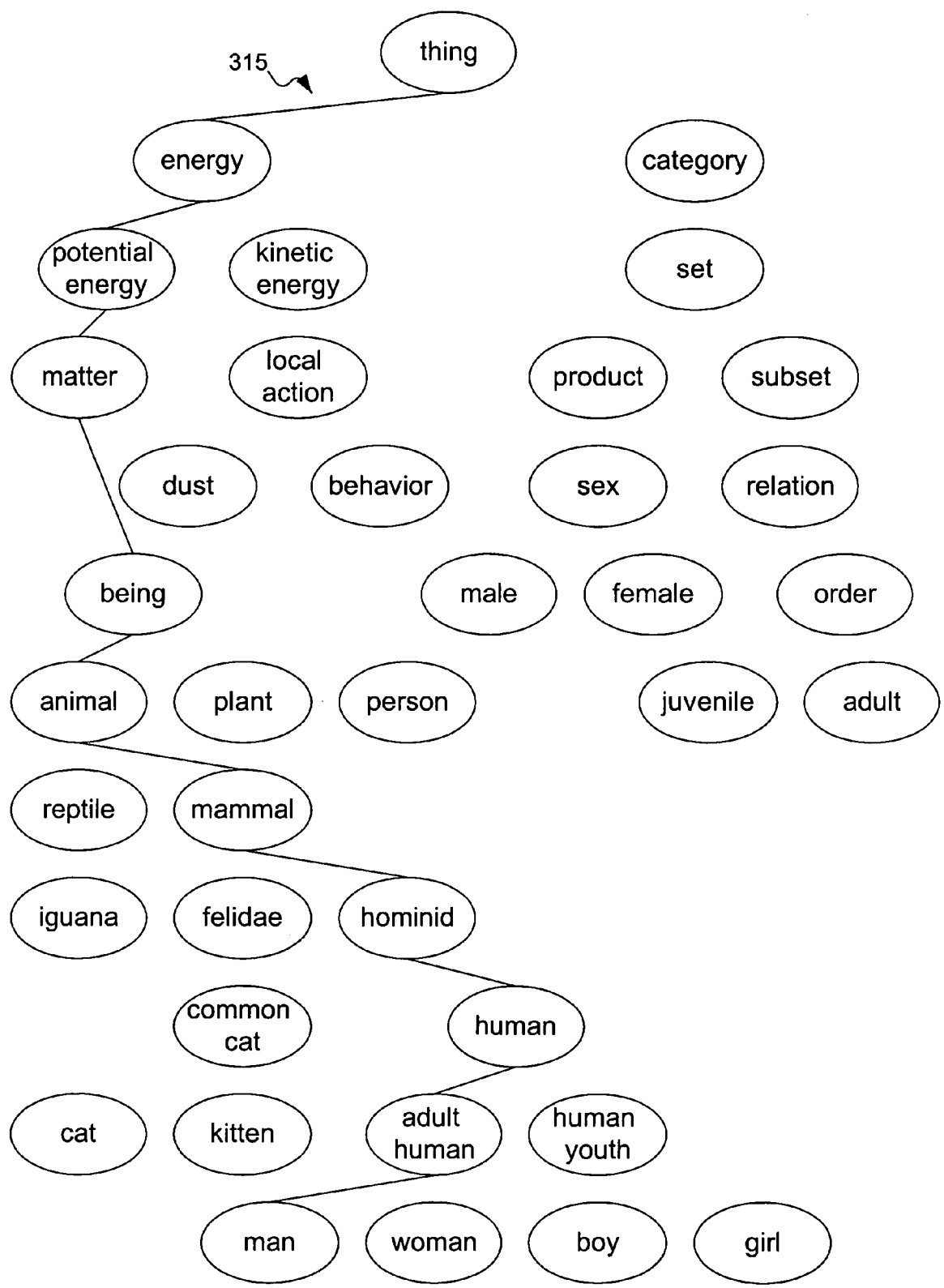
Figure 3D:
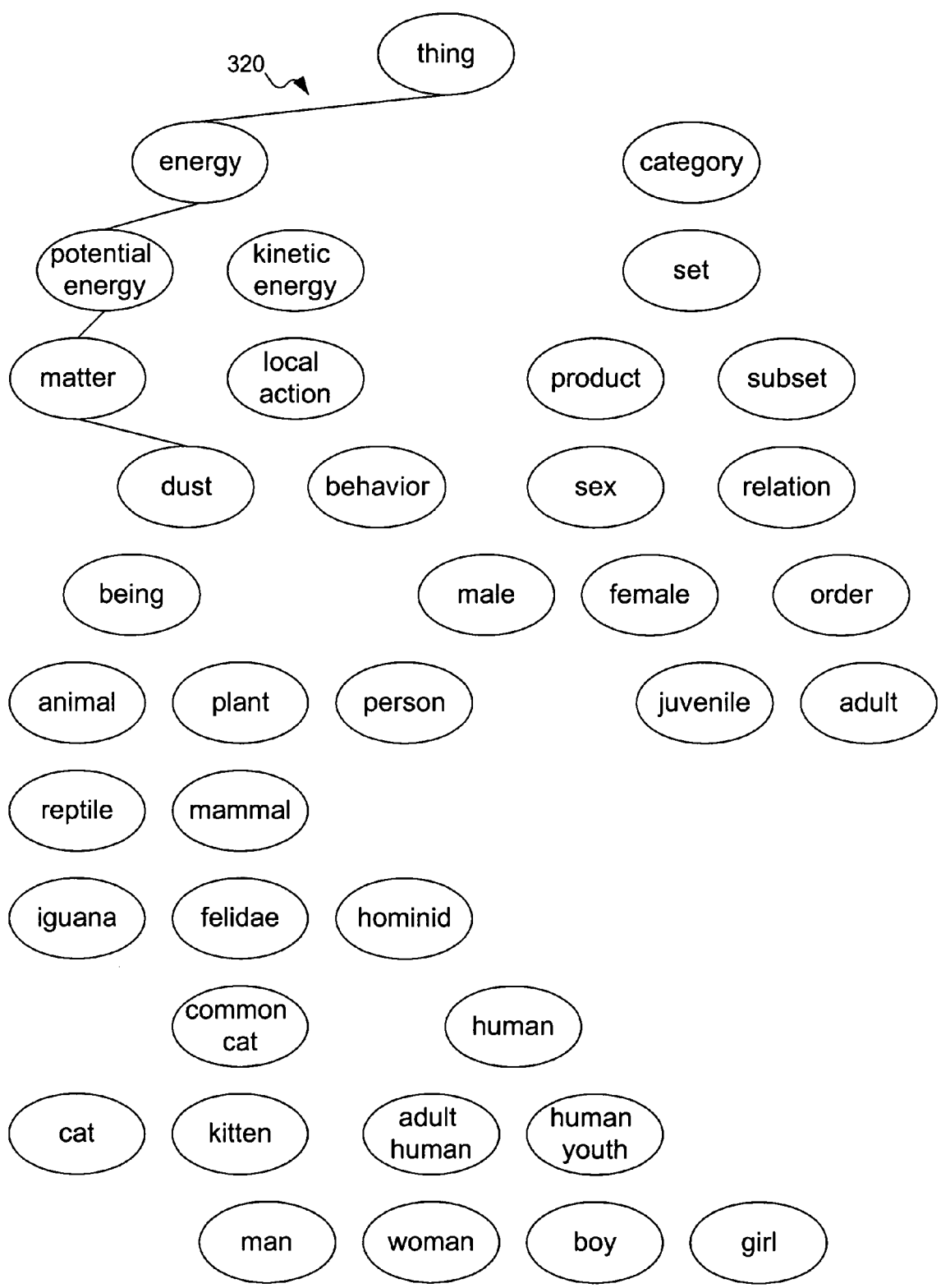
Figure 3E:
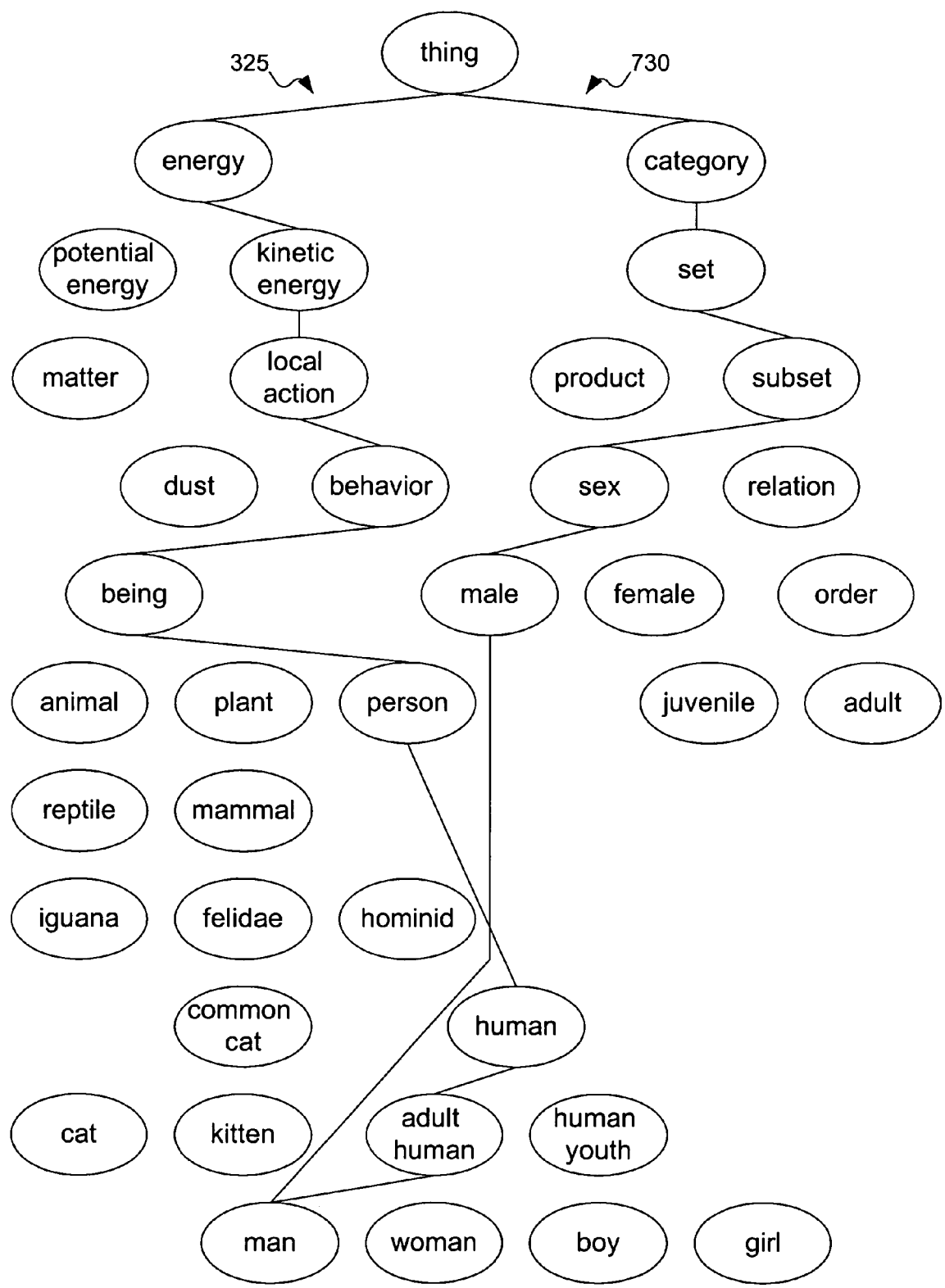
Figure 3F:
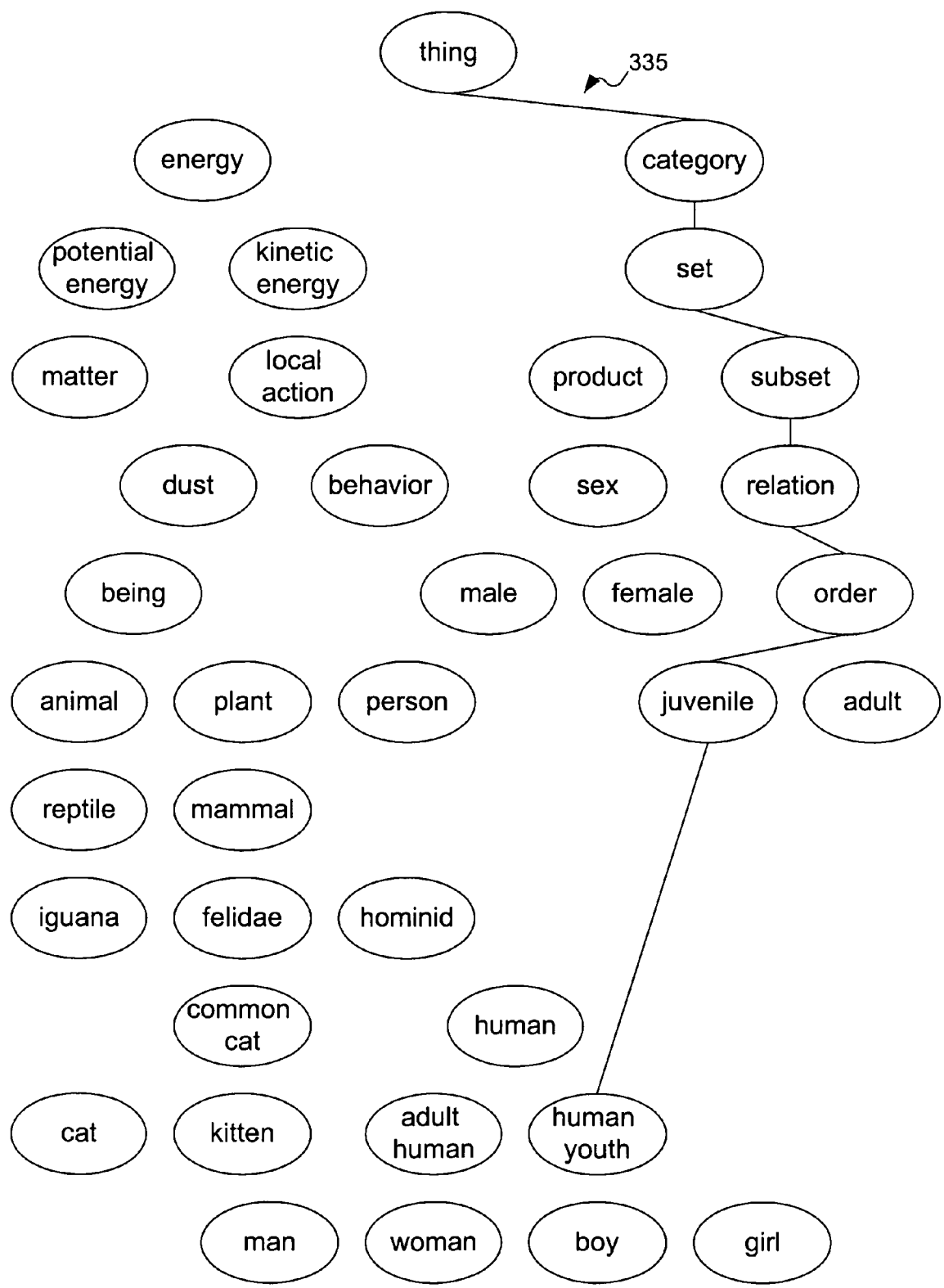
Figure 3G:
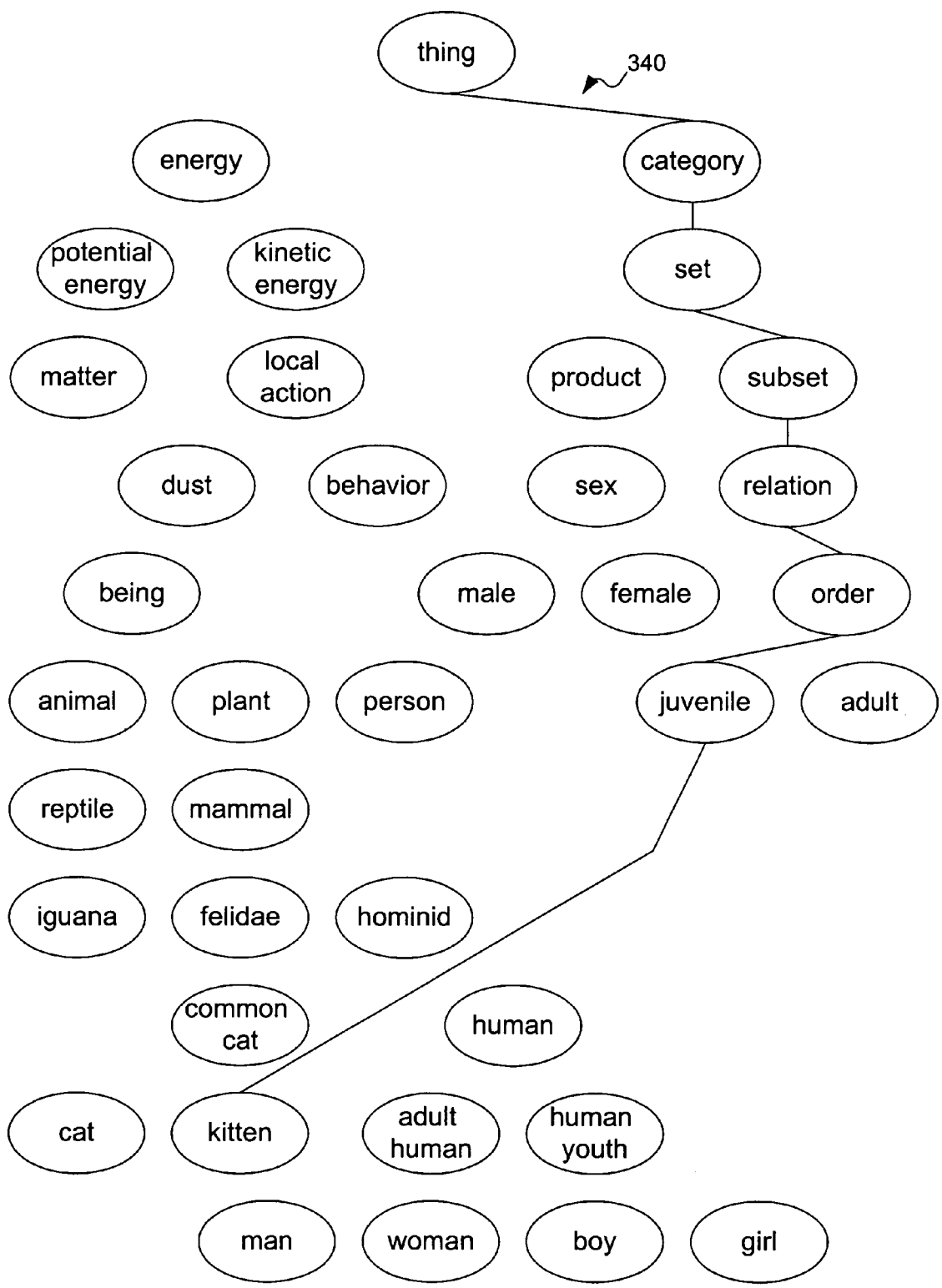

ISBCs 140 are a selected subset of the chains in dictionary 135. For example, FIGS. 3A-3G show eight different chains in the dictionary of FIG. 2 that can be selected as ISBCs 140. FIG. 3A shows chain 305, which extends to concept "man" through concept "energy.". FIG. 3B shows chain 310 extending to concept "iguana." FIG. 3C shows another chain 315 extending to concept "man" via a different path. FIGS. 3D-3G show other chains.

In a chain, for any pair of concepts, one concept is closer to the maximal element than the other; the concept closer to the maximal element can be considered a lineal ancestor of the other concept. (Conversely, the second concept can be considered a lineal descendant of the first concept.) The terms "lineal ancestor" and "lineal descendant" can be considered generalizations of the "parent" and "child" ideas discussed above. The maximal element is, by definition, closer to itself than any of the other concepts; therefore, the maximal element can be thought of as a lineal ancestor of all other concepts in the directed set (and all other concepts in the directed set can be considered lineal descendants of the maximal element).

Returning to FIG. 1, ISBCs 140 play the same role in building state vectors for templates that the basis chains play in creating state vectors in the Construction application. Any desired set of ISBCs can be selected from the chains in dictionary 135. Although comparing a template with an impact summary requires that the template and impact summary be constructed using the same selected chains, topological vector space transformations can be performed to allow comparison. One of the impact summary and the template can be transformed to use the other's basis chains, or both can be transformed to a normative, preferred dictionary/basis combination.

Once ISBCs 140 have been selected, the lexemes/lexeme phrases chosen to create the template are mapped to state vectors in a topological vector space. These state vectors are then assembled into template 145. Action 150 representing the user's desired response is assigned to template 145. Finally, comparison software 155 is used to compare template 145 with an impact summary for the content in question. If necessary, comparison software 155 can construct an impact summary for the content.

Although the content compared with template 145 can be found stored on computer system 105, this is not required. FIG. 1 shows computer system 105 accessing a content stream 160 over network connection 165. Content stream 160 can be a single document, or it can include multiple sources. Content streams with multiple sources are common in today's world. For example, newsgroups and discussion lists (e-mail lists) allow multiple users to carry on several conversations on multiple topics at the same time. Newsgroups and discussion lists are typically organized into a hierarchy. The newsgroup itself has a content focus. This content focus is divided into sub-topics, called threads. Each thread is further divided into individual messages from individual users. FIG. 1 shows content stream 160 as having two threads. Thread one has two messages, and thread two has three messages.

Depending on the level of abstraction the user wishes to track, the template can be compared with different impact summaries. For example, a user may have an emotional reaction to the entire content stream, without looking at individual messages within the content stream (e.g., an entire newsgroup devoted to support of abortion). Alternatively, the user might have a reaction to only a thread within the newsgroup (e.g., a thread about abortion within a medical newsgroup), or to only an individual message.

Network connection 165 can include any kind of network connection. For example, network connection 165 can enable computer system 105 to access content stream 160 over a local area network (LAN), a wide area network (WAN), a global internetwork, a wireless network or broadcast network, or any other type of network. Similarly, once collected, the impact summary can be stored somewhere on computer system 105, or can be stored elsewhere using network connection 165.

Using Templates

Figure 4:
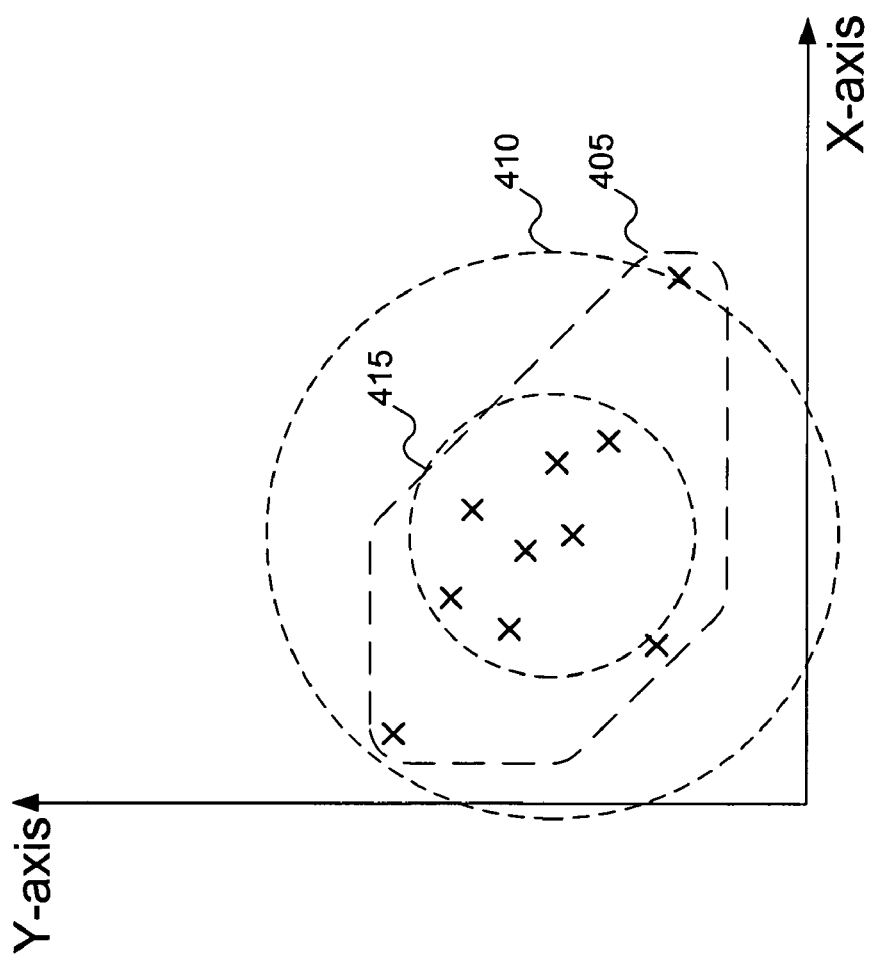
FIG. 4 shows a two-dimensional topological vector space in which a template is presented.

FIG. 4 shows a two-dimensional topological vector space in which a template includes a set of state vectors. (FIGS. 4 and 5, although accurate representations of a topological vector space, are greatly simplified for example purposes, since most topological vector spaces will have significantly higher dimensions.) In FIG. 4, template 405 includes the state vectors represented by the "x" symbols. (For clarity, the line segments from the origin of the topological vector space to the heads of the state vectors are not shown in FIG. 4.)

Circle 410 represents the threshold distance defined for template 405 before an action is taken. The reader will recognize that circle 410 is an abstraction, since in the preferred embodiment distance is not measured from a single point in the topological vector space. Instead, in the preferred embodiment distance is measured from the entire set of vectors comprising the template. But if template 405 could be reduced to a single point in the topological vector space, circle 410 could represent a threshold distance. Any impact summaries that came within circle 410 would then trigger the action associated with template 405.

Although in the preferred embodiment the template includes only one associated action and one threshold distance, a user may have different emotional responses depending on how close the content source gets to the template. For example, an anti-abortion activist might find a theoretical discussion about the benefits of abortion merely unsettling and worth only paying closer attention (say, having follow-up articles e-mailed to his attention). An article reporting an abortion performed by a doctor might make the activist feel quite unhappy (prompting a letter to his congressperson). And a report about pending legislation to keep abortion legal might make the activist very angry (and cause him to start circulating a petition to prevent the legislation). The activist might then set up a number of different actions depending on how close the content source gets to the template, and associate different threshold distances to each action. Circle 415 represents such a second threshold distance associated with a different action for the template.

The Hausdorff Distance Function

As template 405 consists of a set of vectors, the preferred embodiment for measuring distance from template 405 to an impact summary is via the Hausdorff distance function. The following is excerpted from the Construction and Semantic Abstracts applications.

Recall that in the Construction application it was shown that $\mathcal{H}(S)$ is the set of all compact (non-empty) subsets of a metrizable space S. The Hausdorff distance h is defined as follows: Define the pseudo-distance $\Sigma(x, u)$ between the point $x \in S$ and the set $u \in \mathcal{H}(S)$ as $$\Sigma(x,u)=\min \{d(x,y): y \in u\}.$$

Using $\Sigma$ define another pseudo-distance $\lambda(u, v)$ from the set $u \in \mathcal{H}(S)$ to the set $v \in \mathcal{H}(S)$:

$$\lambda(u,v)=\max \{\Sigma(x,v): x \in u\}$$

Note that in general it is not true that $\lambda(u, v)=\lambda(v, u)$. Finally, define the distance $h(u, v)$ between the two sets $u, v \in \mathcal{H}(S)$ as $$h(u,v)=\max \{\lambda(u,v), \lambda(v,u)\}.$$

The distance function h is called the Hausdorff distance. Note that $$h(u,v)=h(v,u),$$

$$0<h(u,v)<\infty \text{ for all } u,v \in \mathcal{H}(S), u \neq v,$$

$$h(u,u)=0 \text{ for all } u \in \mathcal{H}(S), \text{ and}$$

$$h(u,v) \leq h(u,w)+h(w,v) \text{ for all } u,v,w \in \mathcal{H}(S).$$

Alternatives to the Hausdorff Distance Function

In the Semantic Abstracts application, one alternative to using the Hausdorff distance function was to locate a centroid vector for the semantic abstract. The same techniques are applicable to templates. By locating a centroid vector (using any measure of central tendency) for the template, distance functions that depend on single points (e.g., Euclidean distance) can be used to measure distance from the template to the impact summary.

Measuring Distance from the Template

Figure 5:
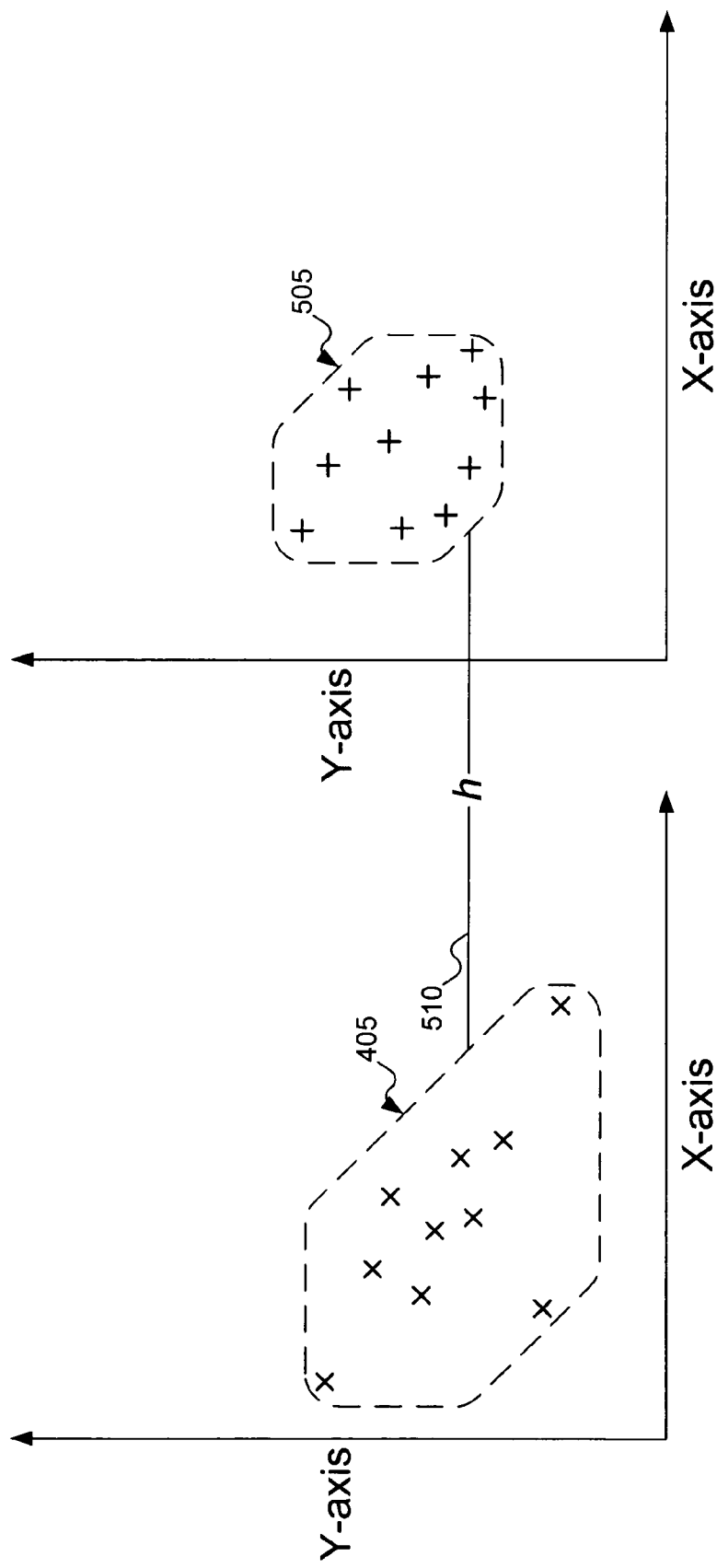
FIG. 5 shows a two-dimensional topological vector space in which the emotional impact of a document is determined by measuring the distance between an impact summary for the document and a template.

FIG. 5 shows a two-dimensional topological vector space in which template 405 is compared with an impact summary for a document. (To avoid clutter in the drawing, FIG. 5 shows template 405 and impact summary 505 in different graphs of the same topological vector space. The reader can imagine the template and impact summary as being in the same graph.) Using the Hausdorff distance function h, the distance 510 between template 405 and impact summary 505 can be quantified. If distance 510 is smaller than the threshold distance defined for template 405, then the action associated with template 405 will be triggered.

Procedural Implementation

Figure 6:
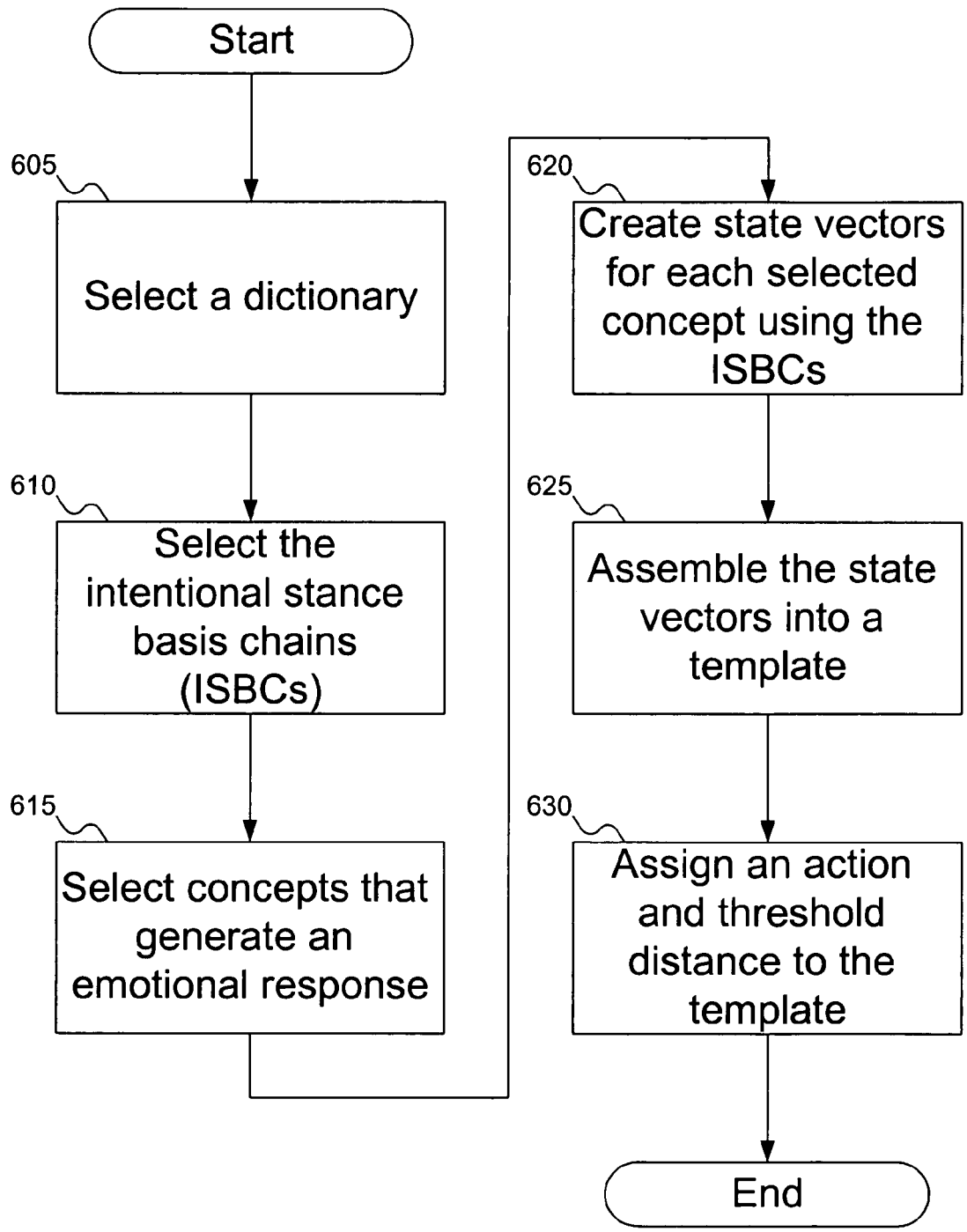
FIG. 6 shows a flowchart of a method to construct it a template in the computer system of FIG. 1 according to the preferred embodiment of the invention.

FIG. 6 shows a flowchart of a method to construct a template in the computer system of FIG. 1 according to the preferred embodiment of the invention. At step 605, a dictionary (a directed set of concepts and chains) is selected. At step 610, a subset of the chains in the dictionary is selected as ISBCs. Any dictionary can and basis chains can be used, but one dictionary/basis combination might be preferred over another, for example, because it would avoid requiring a topological vector space transformation. At step 615, the concepts (lexemes/lexeme phrases) in the dictionary that generate an emotional response are selected. The concepts are typically selected based on trigger concepts, often in phrases that make sense to the reader (for example, "doctors performing abortions at clinics"). At step 620, state vectors are constructed for the selected concepts. The ISBCs are used to construct the state vectors. At step 625, the state vectors are assembled (collected into a set) to form the template. Finally, at step 630, an action and threshold distance are assigned to the template.

Figure 7:
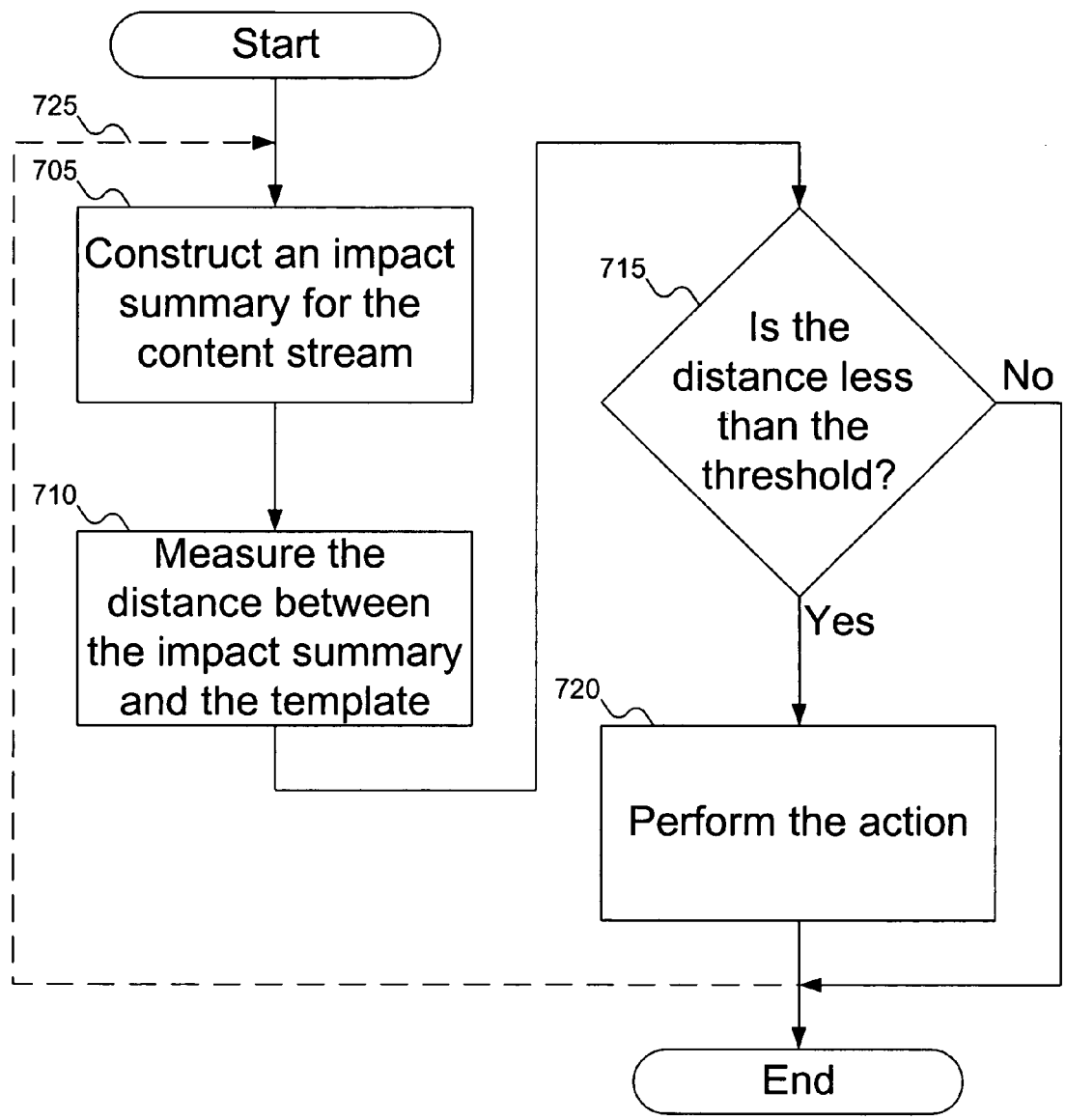
FIG. 7 shows a flowchart of a method to analyze a content stream in the computer system of FIG. 1 to determine if an emotional response is required.

FIG. 7 shows a flowchart of a method to analyze a content stream in the computer system of FIG. 1 to determine if an emotional response is triggered. At step 705, an impact summary is constructed for the content stream. At step 710, the distance from the impact summary to the template is measured. At step 715, the distance is checked against the threshold for taking the action associated with the template. If the distance indicates that the impact summary is within the threshold for taking action associated with the template, then at step 720 the action is performed.

Monitoring Changes in Content

Although the above description treats content as a static object, it is not. Content changes over time. For example, returning to the example of the newsgroup, threads die out as users stop posting new messages regarding the thread or moderators kill improper threads. New threads pop up as new subjects are proposed. People's viewpoints change as one argument or another sways them. As content changes, the need for action can accordingly change. For example, if the newsgroup is about medicine, the above-described anti-abortion activist might originally have no emotional response one way or the other to the newsgroup. But when a thread on the subject of abortion appears, the activist's interest increases. And as people start posting messages supporting abortion, the activist begins to take action. Accordingly, the user needs to update impact summaries to make sure the impact summary is current. In FIG. 7, dashed line 725 reflects this need. Periodically, the system starts over at step 705 to determine the current content of the source.

A Benefit of Templates

One use of the intentional stance impact template is for authors to try and gauge how their works will be received. An author can construct a template he expects his readers to use in reviewing the work. The author can then apply the template to the work and see how close the work comes to the template. For example, if the work discusses the medical benefits of abortion, the author can construct a template that an anti-abortion activist might use, and see how close the article comes to the template. This allows the author to estimate how others might respond to the work. The author can then further refine the work if the provoked response is not as desired.

The above-described embodiments of the invention can be implemented as software stored on a computer-readable medium. The program can then operated on a computer to execute the software.

Another example of how templates can be used is illustrated in related co-pending U.S. patent application Ser. No., 09/650,660, entitled "POLICY ENFORCEMENT USING THE SEMANTIC CHARACTERIZATION OF TRAFFIC," filed simultaneously herewith.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An apparatus for building a template specifying an emotional response to a content stream, the apparatus comprising:
   a computer;
   a dictionary stored in the computer including a plurality of concepts to form a directed set, only one concept identified as a maximal element, and a plurality of chains extending from the maximal element to each other of the plurality of concepts;
   an intentional stance basis including a subset of the plurality of chains in the directed set;
   for selected concepts in the dictionary, a state vector in a topological vector space corresponding to the selected concept wherein each state vector in the topological vector space includes at least one measure of how concretely the corresponding concept is represented in each chain in the intentional stance basis;
   a template including the state vectors in the topological vector space; and
   an action associated with the template.

2. An apparatus according to claim 1, the apparatus further including:
   a threshold distance for the template; and
   means for performing the action associated with the template when an impact summary of the content stream is within the threshold distance of the template, the impact summary including at least one state vector constructed using the dictionary and the intentional stance basis.

3. An apparatus according to claim 2, wherein:
   the threshold distance includes a plurality of threshold distances for the template;
   the action includes a plurality of actions associated with the template; and
   the means for performing the action includes means for performing one of the plurality of actions when the impact summary of the content stream is within one of the threshold distances of the template.

4. An apparatus for comparing a template with a content stream to determine whether the content stream provokes an emotion response, the apparatus comprising:
   a computer having access to the content stream;
   a template in a topological vector space stored in the computer, the template including a first plurality of state vectors in a topological vector space, an associated action, and a threshold distance, where each of the first plurality of state vectors in the topological vector space corresponds to a concept in a directed set, the directed set including a plurality of concepts only one of which is a maximal element, directed links defining "is a" relationships between concepts in pairs of concepts, so that each concept is either a source or a sink of at least one directed link, and a plurality of chains extending from the maximal element to each concept along the directed links, where for each pair of concepts in each chain, one of the pair of concepts is a lineal ancestor of the other of the pair of concepts, and each of the first plurality of state vectors in the topological vector space includes at least one measure of how concretely the corresponding concept is represented in each intentional stance basis chain in a subset of the plurality of chains in the directed set;

means for capturing an impact summary for the content stream, the impact summary including a second plurality of state vectors in the topological vector space; and means for comparing the impact summary with the template.

5. An apparatus according to claim 4, wherein the means for comparing the impact summary with the template includes means for measuring a distance between the impact summary and the template.

6. An apparatus according to claim 5, wherein:
the template includes a template centroid vector located from the first plurality of state vectors; and
the impact summary includes an impact summary centroid vector located from the second plurality of state vectors.

7. An apparatus according to claim 6, wherein the means for measuring a distance between the impact summary and the template includes means for measuring a Euclidean distance between the impact summary centroid vector and the template centroid vector.

8. An apparatus according to claim 5, the apparatus further comprising means for performing the action associated with the template if the distance between the impact summary and the template is less than the threshold distance of the template.

9. An apparatus according to claim 4, wherein:
each of the second plurality of state vectors in the topological vector space corresponds to a second concept in a second directed set and includes at least one measure of how concretely the corresponding second concept is represented in each of a plurality of second chains of a second intentional stance basis in the second directed set; and
the apparatus includes a transformer for performing a topological vector space transformation on the impact summary from the second intentional stance basis to the intentional stance basis.

10. An apparatus according to claim 4, wherein each of the second plurality of state vectors in the topological vector space corresponds to a second concept in the directed set and includes at least one measure of how concretely the corresponding second concept is represented in each of the plurality of chains of the intentional stance basis.

11. A computer-readable medium containing a program operable on a computer to build a template specifying an emotional response to a content stream, the program comprising:
selection software to select a dictionary, the dictionary including a plurality of concepts to form a directed set, wherein only one concept is a maximal element;
establishment software to establish directed links between pairs of concepts in the directed set, the directed links defining "is a" relationships between the concepts in the pairs of concepts, so that each concept is either a source or a sink of at least one directed link;
establishment software to establish intentional stance basis chains in the directed set from the maximal element to each concept along the directed links, where for each pair of concepts in each intentional stance basis chain, one of the pair of concepts is a lineal ancestor of the other of the pair of concepts;
selection software to select a subset of the intentional stance basis chains to form a basis;
selection software to select at least one concept in the dictionary;
creation software to create a state vector in a topological vector space corresponding to each selected concept, wherein each state vector in the topological vector space includes as its components measures of how concretely the corresponding selected concept is represented in each intentional stance basis chain in the basis;
assembly software to assemble the state vectors in the topological vector space into a template; and
association software to associate an action with the template.

12. A computer-readable medium containing a program operable on a computer to compare a template with a content stream to determine whether the content stream provokes an emotion response, the method comprising:
selection software to select a dictionary, the dictionary including a plurality of concepts to form a directed set, wherein only one concept is a maximal element;
establishment software to establish directed links between pairs of concepts in the directed set, the directed links defining "is a" relationships between the concepts in the pairs of concepts, so that each concept is either a source or a sink of at least one directed link;
establishment software to establish intentional stance basis chains in the directed set from the maximal element to each concept along the directed links, where for each pair of concepts in each intentional stance basis chain, one of the pair of concepts is a lineal ancestor of the other of the pair of concepts;
selection software to select a subset of the intentional stance basis chains to form a basis;
selection software to select a plurality of concepts in the dictionary;
creation software to create a state vector in a topological vector space corresponding to each selected concept, wherein each state vector in the topological vector space includes a measure of how concretely the corresponding selected concept is represented in each intentional stance basis chain in the basis;
assembly software to assemble the state vectors in the topological vector space into a template;
association software to associate an action with the template;
construction software to construct an impact summary for the content stream, the impact summary including at least one state vector; and
comparison software to compare the impact summary with the template.

* * * * *

UNITED STATES PATENT AND TRADEMARK OFFICE
CERTIFICATE OF CORRECTION

PATENT NO. : 7,286,977 B1 Page 1 of 1
APPLICATION NO. : 09/653713
DATED : October 23, 2007
INVENTOR(S) : Stephen R. Carter et al.

It is certified that error appears in the above-identified patent and that said Letters Patent is hereby corrected as shown below:

Column 3, line 58, the word "230" should read -- 130 --;

Column 4, line 2, the word "tan" should read -- than --;

Column 4, line 6, the word "wards" should read -- words --;

Column 6, line 23, the equation " $\Sigma(x, u) = \min\{d(x, y) : y \in u\}.$ " should read -- $\xi(x, u) = \min\{d(x, y) : y \in u\}.$ --;

Column 6, line 33, the equation " $\lambda(u, v) = \max\{\Sigma(x, v) : x \in u\}.$ " should read -- $\lambda(u, v) = \max\{\xi(x, v) : x \in u\}.$ --;

Column 6, line 39, the equation " $0 < h(u, v) < \infty$ for all $u, v, \in \mathcal{H}(S), u \neq v,$ " should read -- $0 < h(u, v) < \infty$ for all $u, v \in \mathcal{H}(S), u \neq v,$ --.

Signed and Sealed this

Thirtieth Day of December, 2008

JON W. DUDAS
*Director of the United States Patent and Trademark Office*